United States Patent Office 2,985,319
Patented May 23, 1961

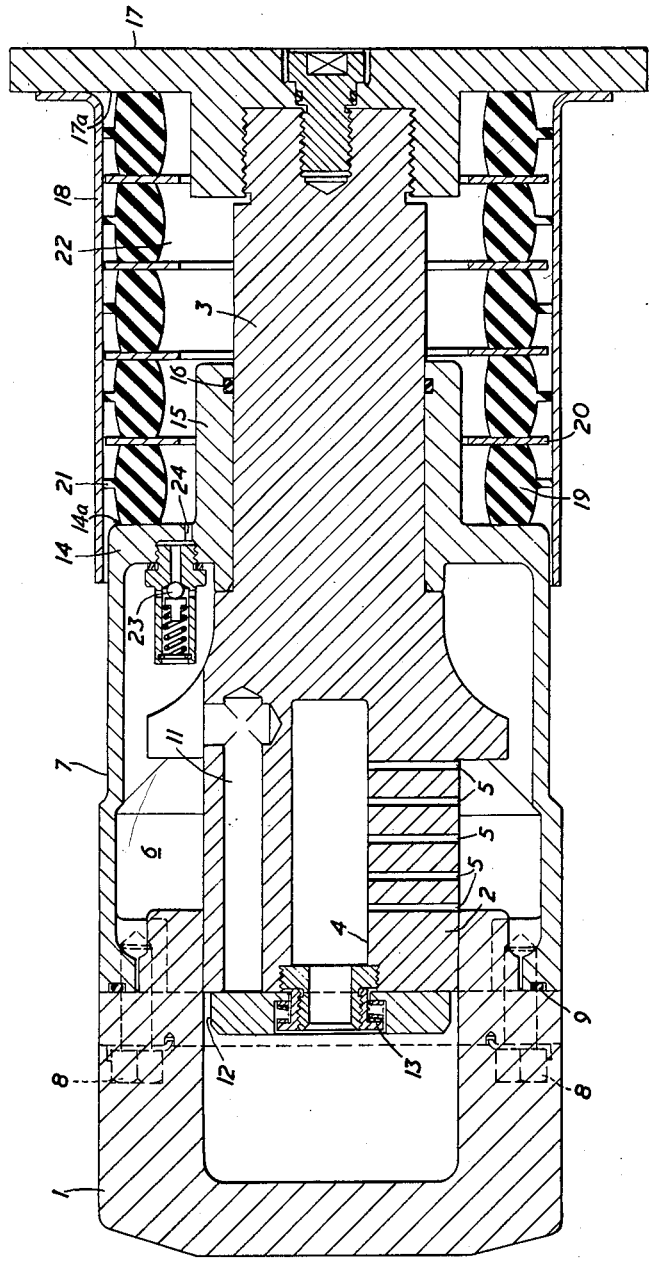

2,985,319

HYDRAULIC SHOCK ABSORBERS

Harold C. Simmons, South Euclid, Ohio, assignor to Dowty Hydraulic Units Limited, Tewkesbury, England, a company of Great Britain Filed Feb. 15, 1960, Ser. No. 8,711

Claims priority, application Great Britain Mar. 3, 1959

7 Claims. (Cl. 213—45)

This invention relates to telescopic hydraulic shock absorbing devices, and in particular to such devices constructed for use on railway vehicles as central draft gear or as side buffers.

Railway vehicle shock absorbers require a strong recoil spring so that the draft gear or side buffers, as the case may be, will restore the normal spacing between the vehicles after impact. The spring is desirably a mechanical one as distinct from pneumatic so that there are no high fluid pressures to be maintained over a long period by seals which act between sliding surfaces of the shock absorber parts. Even at low or zero pressures hydraulic fluid may be carried by a sliding surface across a seal in the form of a very thin film, so that over a long period of time and a large number of operations the leakage may adversely affect the performance of the shock absorber without actual damage to the seal having occurred.

The object of the invention is to provide a shock absorber construction incoporating a mechanical recoil spring and substantially eliminating the possibility of fluid leakage.

According to the invention, a shock absorbing device comprises two components telescopically mounted one in the other and together enclosing a hydraulic shock absorber, an annular seating formed on each of the components, the two seatings being axially separated, at least one ring of resilient elastomeric material interposed sealingly between the two seatings so as to be yieldable in compression upon telescopic closing movement of the one component in the other, said resilient elastomeric material being radially spaced from the one component between the annular seatings to define an outwardly sealed annular cavity, and a valve-controlled return flow passage formed in one of the slidable components and leading from the annular cavity to the hydraulic shock absorber.

The ring or rings of elastomeric material and the annular cavity enclosed thereby are preferably separated from a low pressure liquid reservoir of the shock absorber by sliding surfaces of the two components between which a sealing ring is interposed. There may, over a larger number of shock absorber operations, be a slight leakage of hydraulic liquid from the reservoir into the annular cavity, and the return flow passage may have a non-return valve therein through which some of the accumulation of leakage liquid is expelled upon full compression of the shock absorber.

One form of shock absorbing device for use as railway vehicle draft gear is illustrated in axial section in the accompanying drawing.

The device comprises a pressure cylinder 1 in which the piston-shaped head 2 of a plunger 3 is slidably mounted. A central bore 4 in the piston opens from the interior of the cylinder 1 and leads by way of a plurality of axially spaced radial orifices 5 into the reservoir chamber 6. The axially spaced orifices 5 are closed off in succession by the end of the cylinder 1 to provide in known manner a substantially continuous shock absorber resistance throughout the compression stroke.

The reservoir 6 is outwardly contained by a casing 7 which is secured to the cylinder 1 by bolts 8 while a static sealing ring 9 is interposed between abutting surfaces of the casing 7 and cylinder 1. A portion of the reservoir 6 lies about the upper side of the piston 2 and contains air which is compressed upon expulsion of hydraulic fluid from the pressure cylinder 1. The air volume is, of course, in excess of the displacement of the piston 2 so as to accommodate all the discharged hydraulic fluid. Rapid return of hydraulic liquid under air pressure can take place through three equally spaced passages 11, of which only one is shown in the drawing, and past a plate valve 12 on the end of the piston 2 which is loaded against the end of the piston by a spring 13.

The air pressure in the reservoir provides a small part of the recoil force on the shock absorber, but by far the larger part of the force is provided by the rubber spring herein described.

The casing 7 terminates remote from the cylinder 1 in a wall 14 which leads radially inwardly into a bearing bush 15 wherein the plunger 3 is slidable. A sealing ring 16 recessed into the bush 15 bears against the plunger. The outer end of the plunger carries a plate 17 and towards the periphery of the plate 17 an external protective sleeve 18 is secured, this sleeve being slidable with adequate clearance over a portion of the casing 7.

Within the sleeve 18 a spring of rubber or like material comprising a pack of alternate rubber rings 19 and rigid plates 20 is compressively interposed between seating faces 14a and 17a on the transverse face of the wall 14 and the inner face of the end plate 17 respectively. The rubber rings 19 may be bonded to the end faces against which they are compressed. Each ring 19 of rubber or like material is normally rectangular in cross-section but becomes barrel-shaped when compressed in the preloaded condition shown, and each is located spaced concentrically from the inner surface of the sleeve 18 by a number of integral yieldable lugs 21. The rings are also spaced interiorly from the bearing bush 15. The interior space 22 enclosed by the spring and the volume of the rubber or like material is chosen so that when the spring is fully compressed beyond the preloaded condition the interior volume 22 is considerably reduced in value. This volume is preferably maintained at partial vacuum by compressing the spring on assembly of the shock absorber and allowing the air contained therein to be expelled through a non-return valve 23 in the wall 14 of the reservoir 6. Subsequently, the reservoir 6 and cylinder 1 are filled with the requisite quantity of oil.

If after a large number of operations oil has leaked through to the space 22 contained within the spring in sufficient amount to reach the level of the inlet passage 24 to the relief valve 23 upon compression of the shock absorber, then some of this oil will be pumped back into the reservoir 6 during the ultimate portion of the compression stroke. Therefore, provided the pack of rubber or like springs or plates 20 is interposed with adequate compression between the two telescopic components to provide a satisfactory static seal against them the shock absorber will operate without loss of oil exteriorly and will therefore require no periodic topping-up.

The invention is therefore of particular advantage in hydraulic draft gear where the device described is formed as a capsule which is mounted in a draft gear yoke underneath the wagon frame, and is accordingly difficult of access for servicing.

I claim as my invention:

1. A shock-absorbing device comprising a cylinder component having a bore forming a pressure chamber, and a chamber forming a reservoir for hydraulic liquid, a plunger component slidably mounted in the cylinder component both to enter the pressure chamber and to close the reservoir chamber, orifice means connecting the pressure chamber and the reservoir chamber, a first annular seating formed externally on the cylinder component, a second annular seating axially spaced from the first formed on that portion of the plunger component which projects from the cylinder component, a spring composed in part at least of resilient elastomeric material interposed sealingly between the first and second seatings, said spring being formed as an annulus which is radially spaced from the plunger component to define an outwardly sealed annular cavity, and a valve-controlled return flow passage formed in one of the components and leading from the annular cavity to the reservoir chamber.

2. A shock-absorbing device as in claim 1, wherein the valve-controlled passage is formed in the cylinder component and includes a non-return valve openable under liquid flow from the annular cavity to the reservoir chamber.

3. A shock-absorbing device as in claim 1, wherein the spring comprises a plurality of rings of resilient elastomeric material and intervening rigid plates together interposed compressively between the first and second seatings.

4. A shock-absorbing device as in claim 3, including a protective sleeve fixed to the projecting portion of the plunger component and surrounding the plurality of resilient elastomeric rings and rigid plates.

5. A shock-absorbing device as in claim 4, wherein each resilient elastomeric ring is radially spaced from the protective sleeve by a number of yieldable lugs which are integral with the resilient elastomeric rings.

6. A shock-absorbing device comprising a cylinder component having a bore forming a pressure chamber, and a chamber axially spaced from the bore forming a reservoir for hydraulic liquid, a plunger component slidably mounted through both ends of the reservoir chamber to engage at its inner end within the bore of the pressure chamber, a discharge passage formed in the inner end portion of the plunger component to form a liquid connection between the pressure chamber and the reservoir chamber, said discharge passage including a plurality of axially spaced radial orifices opening at the surface of the inner end portion of the plunger component so as to be successively closed by the bore of the pressure chamber upon compression of the shock-absorbing device, a return passage formed in the inner end portion of the plunger component to establish liquid communication between the reservoir chamber and the pressure chamber, said return passage including a non-return valve openable under liquid flow from the reservoir chamber to the pressure chamber, a first annular seating formed externally on the cylinder component, a second annular seating axially spaced from the first formed on that portion of the plunger component which projects from the cylinder component, a spring composed in part at least of resilient elastomeric material interposed sealingly between the first and second seatings, said spring being formed as an annulus which is radially spaced from the plunger component to define an outwardly sealed leakage receiving cavity, a passage in one of the components leading from the cavity to the reservoir chamber, and a non-return valve in said passage openable under return flow of leakage liquid expelled from the cavity during compression of the shock-absorbing device.

7. A shock-absorbing device comprising a first and a second component, the first whereof is telescopically mounted within and a portion whereof projects axially beyond the second to define a hydraulic shock absorber, an annular seating formed on each of the components, externally of the shock absorber, the two seatings being axially separated, at least one ring of resilient elastomeric material interposed sealingly between the two seatings and radially spaced from the projecting portion of the first component to define an outwardly sealed annular cavity, wherein is contained the exit of the projecting portion of the first component from the second, said resilient elastomeric material being yieldable in compression upon telescopic closing relative movement between the two components, and a valve-controlled return flow passage in one of said components interconnecting said annular cavity and the interior of the hydraulic shock absorber, arranged to permit flow from the annular cavity to the hydraulic shock absorber upon telescopic closing movement of the latter's components.

References Cited in the file of this patent

UNITED STATES PATENTS 2,928,507    Thompson  ------------  Mar. 15, 1960